(12) United States Patent
Natsui et al.

(10) Patent No.: US 9,504,980 B2
(45) Date of Patent: Nov. 29, 2016

(54) THERMALLY EXPANDABLE MICROCAPSULE

(75) Inventors: Hiroshi Natsui, Osaka (JP); Hiroshi Yamauchi, Osaka (JP); Hiroyuki Morita, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 749 days.

(21) Appl. No.: 13/637,243

(22) PCT Filed: Mar. 14, 2011

(86) PCT No.: PCT/JP2011/055945
§ 371 (c)(1),
(2), (4) Date: Nov. 27, 2012

(87) PCT Pub. No.: WO2011/118437
PCT Pub. Date: Sep. 29, 2011

(65) Prior Publication Data
US 2013/0065975 A1    Mar. 14, 2013

(30) Foreign Application Priority Data

Mar. 26, 2010 (JP) .................................. 2010-073249
Sep. 7, 2010 (JP) .................................. 2010-200276

(51) Int. Cl.
| | | |
|---|---|---|
| C08L 33/20 | (2006.01) | |
| B01J 13/14 | (2006.01) | |
| C08J 9/32 | (2006.01) | |
| B01J 13/18 | (2006.01) | |
| C08F 283/10 | (2006.01) | |

(52) U.S. Cl.
CPC .............. *B01J 13/14* (2013.01); *B01J 13/185* (2013.01); *C08F 283/10* (2013.01); *C08J 9/32* (2013.01); *C08J 2201/024* (2013.01); *C08J 2203/22* (2013.01); *C08J 2300/22* (2013.01)

(58) Field of Classification Search
None
See application file for complete search history.

(56) References Cited

U.S. PATENT DOCUMENTS 6,235,394 B1 *   5/2001   Shimazawa et al. .... 428/402.21

FOREIGN PATENT DOCUMENTS

| EP | 2 615 130 A1 | 7/2013 |
|---|---|---|
| EP | 2 660 283 A1 | 11/2013 |
| GB | 1044680 | 12/1963 |
| JP | 42-26524 | 12/1942 |
| JP | 2005-029607 | 2/2005 |
| JP | 2005-29607 | 2/2005 |
| JP | 2005-206765 | 8/2005 |
| JP | 2005-213379 | 8/2005 |
| WO | 99/43758 | 9/1999 |
| WO | 2005/078038 | 8/2005 |

OTHER PUBLICATIONS

Eng trans of JP 2005-213379.*
International Search Report issued Jun. 7, 2011 in International (PCT) Application No. PCT/JP2011/055945.
Extended European Search Report issued Jul. 31, 2015, in counterpart European Application No. 11759243.6.
XP-002742508, Aug. 11, 2005, pp. 1-2.

* cited by examiner

*Primary Examiner* — Jeffrey Washville
(74) *Attorney, Agent, or Firm* — Wenderoth, Lind & Ponack, L.L.P.

(57) ABSTRACT

The present invention provides a thermally expandable microcapsule that maintains a high expansion ratio and hardly bursts and shrinks even at a high temperature, a foamable thermoplastic resin masterbatch and a foam molded product that are produced using the thermally expandable microcapsule, and a method for producing the thermally expandable microcapsule. The thermally expandable microcapsule comprises a volatile expansion agent included in a shell as a core agent and the shell formed of a polymer, the shell containing a thermosetting resin and a polymer obtainable by polymerization of a monomer composition containing a nitrile-type monomer and a monomer having a carboxyl group, and the thermosetting resin having no radical-polymerizable double bond and at least two functional groups reactive with a carboxyl group per molecule.

6 Claims, No Drawings

THERMALLY EXPANDABLE MICROCAPSULE

This application is a U.S. national stage of International Application No. PCT/JP2011/055945 filed Mar. 14, 2011.

TECHNICAL FIELD

The present invention relates to a thermally expandable microcapsule that maintains a high expansion ratio and hardly bursts and shrinks even at a high temperature. The present invention also relates to a foamable thermoplastic resin masterbatch comprising the thermally expandable microcapsule. The present invention also relates to a method for producing the thermally expandable microcapsule.

BACKGROUND ART

Thermally expandable microcapsules have been used for various applications as a design-imparting agent or a weight-reducing agent. They have been also used for paint, such as foaming ink and wallpapers, to achieve weight reduction.

As such a thermally expandable microcapsule, widely known is one in which a thermoplastic shell polymer includes a volatile expansion agent that can be gasified at a softening temperature or lower of the shell polymer. Patent Literature 1, for example, discloses a method for producing a thermally expandable microcapsule that includes a volatile expansion agent. That method includes the step of adding an oily mixture and an oil-soluble polymerization catalyst to an aqueous dispersion medium that contains a dispersant, with stirring to cause suspension polymerization. Here, the oily mixture is a mixture of a monomer and a volatile expansion agent, such as a low-boiling aliphatic hydrocarbon.

Although such a thermally expandable microcapsule obtained by this method is thermally expandable by gasification of the volatile expansion agent at a relatively low temperature of about 80 to 130° C., the expanded microcapsule problematically outgasses during heating at a high temperature or heating for a long period of time, so that the expansion ratio is lowered. In addition, due to insufficient thermal resistance and strength of the thermally expandable microcapsule, so-called "deflation" may occur to collapse the microcapsule at a high temperature.

Patent Literature 2 discloses a thermally expandable microcapsule in which a polymer obtainable by polymerization of a carboxyl group-containing monomer with a monomer having a group reactive with a carboxyl group is used as a shell. Patent Literature 2 reports that such a thermally expandable microcapsule has increased three-dimensional crosslinking density, and therefore, it shows strong resistance to shrinkage, and has significantly improved thermal resistance, even if the foamed shell is very thin.

However, formation of rigid three-dimensional crosslinks upon polymerization disturbs expansion during foaming, so that the expansion ratio is still insufficient.

CITATION LIST

Patent Literature

Patent Literature 1: Japanese Kokoku Publication No. Sho-42-26524 (JP-B S42-26524)
Patent Literature 2: WO 99/43758

SUMMARY OF INVENTION

Technical Problems

The present invention provides a thermally expandable microcapsule that maintains a high expansion ratio and hardly bursts and shrinks even at a high temperature, a foamable thermoplastic resin masterbatch and a foam molded product that are produced using the thermally expandable microcapsule, and a method for producing the thermally expandable microcapsule.

Solution to Problem

The present invention provides a thermally expandable microcapsule, which comprises a volatile expansion agent included in a shell as a core agent, and the shell formed of a polymer, the shell containing a thermosetting resin and a polymer obtainable by polymerization of a monomer composition containing a nitrile-type monomer and a monomer having a carboxyl group, and the thermosetting resin having no radical-polymerizable double bond and at least two functional groups reactive with a carboxyl group per molecule.

Hereinafter, the present invention is described in detail.

The present inventors have found out that, in a thermally expandable microcapsule, use of a shell containing a predetermined thermosetting resin and a polymer obtained by polymerization of a monomer composition containing a nitrile-type monomer and a monomer having a carboxyl group maintains a high expansion ratio and suppresses burst and shrinkage at a high temperature, thereby completing the present invention.

The thermally expandable microcapsule of the present invention includes a volatile expansion agent as a core agent in a shell formed of a polymer. Such a configuration allows production of a foam molded product, for example, by molding a mixture of the thermally expandable microcapsule of the present invention blended in a matrix resin so that the core agent is gasified and the shell is softened to expand by heat generated in the molding treatment.

The monomer composition for forming the polymer contains a nitrile-type monomer. The monomer composition containing the nitrile-type monomer provides an obtainable thermally expandable microcapsule with high thermal resistance and gas-barrier properties.

The nitrile-type monomer is not particularly limited, and examples thereof include acrylonitrile, methacrylonitrile, α-chloroacrylonitrile, α-ethoxyacrylonitrile, fumaronitrile, and a mixture of these. In particular, acrylonitrile and methacrylonitrile are preferable. Each of these may be used alone, or two or more of these may be used in combination.

With regard to the amount of the nitrile-type monomer in the monomer composition, the lower limit is preferably 50 parts by weight and the upper limit is preferably 99 parts by weight, for 100 parts by weight of the entire monomer component. If the amount of the nitrile-type monomer is less than 50 parts by weight, the gas-barrier properties may be degraded to lower the expansion ratio. If the amount is more than 99 parts by weight, the amount of the carboxyl group may be too small. As a result, only an insufficient effect may be obtained by the carboxyl group bonded to the thermosetting resin during the heat-foaming treatment.

The lower limit is more preferably 60 parts by weight and the upper limit is more preferably 95 parts by weight.

The monomer composition contains a monomer having a carboxyl group, in addition to the nitrile-type monomer.

The monomer composition containing the monomer having a carboxyl group provides a thermally expandable microcapsule in which the carboxyl group and the thermosetting resin are bonded to each other by heat generated in the heat-foaming treatment, and therefore, the thermal resistance and durability are further improved.

Examples of the monomer having a carboxyl group include unsaturated monocarboxylic acids such as acrylic acid, methacrylic acid, ethacrylic acid, crotonic acid, and cinnamic acid, and unsaturated dicarboxylic acids such as maleic acid, itaconic acid, fumaric acid, and citraconic acid. Further, salts or anhydrides of these may also be used. In particular, acrylic acid and methacrylic acid are preferable.

With regard to the amount of the monomer having a carboxyl group in the monomer composition, the lower limit is preferably 1 part by weight and the upper limit is preferably 50 parts by weight, for 100 parts by weight of the entire monomer component. If the amount of the monomer having a carboxyl group is less than 1 part by weight, the effect of bonding the carboxyl group with the thermosetting resin during heat-foaming may be insufficient. If the amount is more than 50 parts by weight, the gas-barrier properties of the shell may be disturbed, resulting in a lowered expansion ratio.

The lower limit is more preferably 5 parts by weight and the upper limit is more preferably 40 parts by weight.

The monomer composition may contain other monomer(s) copolymerizable with the nitrile-type monomer (hereinafter, also simply referred to as another monomer), in addition to the nitrile-type monomer and the monomer having a carboxyl group.

The other monomer(s) are not particularly limited, and may be selected as appropriate in accordance with required properties of an obtainable thermally expandable microcapsule. Examples thereof include divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, 1,9-nonanediol di(meth)acrylate, di(meth) acrylate of polyethylene glycol having a molecular weight of 200 to 600, glycerol di(meth)acrylate, trimethylolpropane di(meth)acrylate, trimethylolpropane tri(meth)acrylate, ethylene oxide-modified trimethylolpropane tri(meth)acrylate, pentaerythritol tri(meth)acrylate, triallylformal tri(meth) acrylate, pentaerythritol tetra(meth)acrylate, dipentaerythritol hexa(meth)acrylate, and dimethylol-tricyclodecane di(meth)acrylate. Examples thereof further include: acrylic acid esters such as methyl acrylate, ethyl acrylate, butyl acrylate, and dicyclopentenyl acrylate; methacrylic acid esters such as methyl methacrylate, ethyl methacrylate, butyl methacrylate, and isobornyl methacrylate; and vinyl monomers such as vinyl chloride, vinylidene chloride, vinyl acetate, and styrene. Each of these may be used alone, or two or more of these may be used in combination.

In the case where the monomer composition contains another monomer, the amount of another monomer in the monomer composition is not particularly limited. The upper limit thereof is preferably 40 parts by weight for 100 parts by weight of the entire monomer component. If the amount of another monomer is more than 40 parts by weight, the amount of the nitrile-type monomer is relatively reduced so that the thermal resistance and gas-barrier properties of an obtainable thermally expandable microcapsule are lowered. In such a case, the thermally expandable microcapsule may easily burst and shrink at a high temperature and fail to foam at a high expansion ratio.

The monomer composition may further contain a metal cation salt.

Addition of the metal cation salt allows, for example, formation of ionic crosslinks between the carboxyl group of the monomer having a carboxyl group and the metal cation, and in an obtained thermally expandable microcapsule, a crosslinking efficiency of the shell is improved to enhance the thermal resistance. Accordingly, such a thermally expandable microcapsule is less likely to burst and shrink even at a high temperature and is capable of foaming at a high expansion ratio. Moreover, owing to the formation of the ionic crosslinks, the elasticity of the shell in the obtainable thermally expandable microcapsule is less likely to be lowered even at a high temperature. Therefore, such a thermally expandable microcapsule is less likely to burst and shrink and can foam at a high expansion ratio even in the case of being molded by a method such as kneading molding, calendar molding, extrusion molding, and injection molding in which the thermally expandable microcapsule is subjected to a strong shear force after blended in a matrix resin.

The metal cation constituting the metal cation salt is not particularly limited as long as it is a metal cation capable of forming ionic crosslinks with a carboxyl group of a monomer having a carboxyl group such as methacrylic acid. Examples thereof include ions of elements such as Na, K, Li, Zn, Mg, Ca, Ba, Sr, Mn, Al, Ti, Ru, Fe, Ni, Cu, Cs, Sn, Cr, and Pb. Preferable among these are ions of Ca, Zn, and Al which are divalent or trivalent metal cations. Particularly preferable is a Zn ion.

The metal cation salt is preferably a metal cation hydroxide. Each of these may be used alone, or two or more of these may be used in combination.

In the case where two or more of the metal cation salts are used in combination, it is preferable to use a salt formed of ions of an alkaline metal or alkaline earth metal, and a salt formed of a metal cation other than the alkaline metal or alkaline earth metal in combination. The ions of the alkaline metal or alkaline earth metal can activate functional groups such as a carboxyl group to promote ionic crosslinking between the functional group such as a carboxyl group and the metal cation other than the alkaline metal or alkaline earth metal.

The alkaline metal or alkaline earth metal is not particularly limited, and examples thereof include Na, K, Li, Ca, Ba, and Sr. Preferable among these are Na and K which are strongly basic materials.

The amount of the metal cation salt in the monomer composition is not particularly limited. The lower limit thereof is preferably 0.01 parts by weight and the upper limit thereof is preferably 10 parts by weight, for 100 parts by weight of the entire monomer component. If the amount of the metal cation salt is less than 0.01 parts by weight, an effect of improving the thermal resistance of an obtained thermally expandable microcapsule may not be obtained sufficiently. If the amount of the metal cation salt is more than 10 parts by weight, an obtainable thermally expandable microcapsule may not foam at a high expansion ratio.

The monomer composition preferably contains a polymerization initiator.

The polymerization initiator is not particularly limited, and examples thereof include dialkyl peroxides, diacyl peroxides, peroxyesters, peroxydicarbonates, and azo compounds.

The dialkyl peroxides are not particularly limited, and examples thereof include methylethyl peroxide, di-t-butyl peroxide, dicumyl peroxide, and isobutyl peroxide.

The diacyl peroxides are not particularly limited, and examples thereof include benzoyl peroxide, 2,4-dichlorobenzoyl peroxide, and 3,5,5-trimethylhexanoyl peroxide.

The peroxyesters are not particularly limited, and examples thereof include t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and ($\alpha,\alpha$-bis-neodecanoyl peroxy)diisopropyl benzene.

The peroxydicarbonates are not particularly limited, and examples thereof include bis(4-t-butylcyclohexyl) peroxydicarbonate, di-n-propyl-peroxydicarbonate, diisopropyl peroxydicarbonate, di(2-ethylethylperoxy) dicarbonate, dimethoxybutyl peroxydicarbonate, and di(3-methyl-3-methoxybutylperoxy) dicarbonate.

The azo compounds are not particularly limited, and examples thereof include 2,2'-azobisisobutylonitrile, 2,2'-azobis(4-methoxy-2,4-dimethylvaleronitrile), 2,2'-azobis(2,4-dimethylvaleronitrile), and 1,1'-azobis(1-cyclohexanecarbonitrile).

If necessary, the monomer composition may further contain a stabilizer, an ultraviolet absorber, an antioxidant, an antistatic agent, a flame retardant, a silane coupling agent, a coloring agent, and the like.

The weight average molecular weight of a polymer obtainable by polymerization of the monomer composition mentioned above is not particularly limited, and the lower limit is preferably 100,000 and the upper limit is preferably 2,000,000. If the weight average molecular weight is less than 100,000, an obtainable thermally expandable microcapsule may have a shell with lowered strength so as to easily burst and shrink at a high temperature, failing to foam at a high expansion ratio. If the weight average molecular weight is more than 2,000,000, an obtainable thermally expandable microcapsule may have a shell with extremely high strength so that the foaming properties are lowered.

The shell in the thermally expandable microcapsule of the present invention contains a thermosetting resin.

The thermosetting resin is cured upon heat-foaming of the thermally expandable microcapsule, not upon polymerization of the monomer composition. Therefore, expansion during foaming is not disturbed, so that the expansion ratio is increased.

Preferable examples of the thermosetting resin include epoxy resin, phenol resin, melamine resin, urea resin, polyimide resin, and bismaleimide resin. In particular, epoxy resin and phenol resin are preferable.

The epoxy resin is not particularly limited, and examples thereof include bisphenol A-type, bisphenol F-type, phenolic novolac-type, cresol novolac-type, dicyclopentadiene-type, and glycidylamine-type epoxy resins.

Examples of the phenol resin include novolac-type, resol-type, and benzylic ether-type phenol resins. In particular, the novolac-type phenol resin is preferable.

The thermosetting resin has no radical-polymerizable double bond.

Without a radical-polymerizable double bond, the thermosetting resin is not directly bonded to the main chain of a polymer obtainable by polymerization of the monomer composition containing a nitrile-type monomer and a monomer having a carboxyl group, so that the flexibility of the shell is maintained at a high level.

In a conventional method (e.g. Patent Literature 2), use of a monomer having a radical-polymerizable double bond lowers the gas-barrier properties of the shell, resulting in the lowered expansion ratio.

The thermosetting resin has at least two functional groups reactive with a carboxyl group per molecule. Containing at least two functional groups reactive with a carboxyl group per molecule allows the curability of the thermosetting resin to be greater. Especially, in the case where the monomer composition contains a monomer having a carboxyl group, the carboxyl group and the thermosetting resin are more firmly bonded to each other by heat generated in the heat-foaming, so that the thermal resistance and durability are significantly improved.

Examples of the functional group reactive with a carboxyl group include epoxy, phenol, methylol, and amino groups. In particular, an epoxy group is preferable. The same kind of the functional group reactive with a carboxyl group may be used, or alternatively, two or more kinds of the functional groups each reactive with a carboxyl group may be used in combination.

Examples of the thermosetting resin having no radical-polymerizable double bond and at least two functional groups reactive with a carboxyl group per molecule include epoxy resin, phenol resin, urea resin, melamine resin, sorbitol polyglycidyl ether (DENACOL EX-622), polyglycerol polyglycidyl ether (DENACOL EX-521), diglycerol polyglycidyl ether (DENACOL EX-421), glycerol polyglycidyl ether (DENACOL EX-313), pentaerythritol polyglycidyl ether (DENACOL EX-411), resorcinol glycidyl ether (DENACOL EX-201), 1,6-hexanediol glycidyl ether (DENACOL EX-212), ethylene, and polyethylene glycol diglycidyl ether (DENACOL EX-810, all supplied by Nagase ChemteX Corporation).

The thermosetting resin preferably has a curing temperature of not lower than 120° C.

The thermosetting resin having a curing temperature of 120° C. or higher is not cured in polymerization of a polymer obtainable by polymerization of the monomer composition containing a nitrile-type monomer. Therefore, expansion at heat-foaming is not disturbed, leading to a higher expansion ratio.

The curing temperature is determined by measuring a gelation temperature upon heating of a mixture containing a thermosetting resin and citric acid.

The thermosetting resin preferably has a gel fraction of less than 5% at T1.0 and a gel fraction of not less than 5% at T1.5, wherein T1.0 indicates a temperature when the core agent shows a vapor pressure of 1.0 MPa and T1.5 indicates a temperature when the core agent shows a vapor pressure of 1.5 MPa.

The vapor pressure of the core agent can be calculated using the Antoine equation.

The gel fraction of the thermosetting resin can be measured by swelling the thermosetting resin using a gelling agent and then calculating the weight ratio of the dry weight of the swelled body to the total weight of the thermosetting resin and the gelling agent [dry weight of swelled body/(weight of thermosetting resin+weight of gelling agent)].

Here, a predetermined gelling agent may be used in accordance with the kind of the thermosetting resin.

T1.0 is presumably close to the temperature at which the thermally expandable microcapsule starts foaming.

Accordingly, if the gel fraction of the thermosetting resin at T1.0 is 5% or more, the thermosetting resin may be too much cured at the start of foaming, so that foaming is disturbed. Further, along with this, Dmax (maximum foaming displacement) of foamed particles may be reduced. Moreover, the expansion ratio of the foam molded product is lowered.

T1.5 is a temperature at which the internal pressure as the core agent is increased and foam breaking and outgassing of the thermal expandable microcapsule are concerned.

Accordingly, if the gel fraction of the thermosetting resin at T1.5 is less than 5%, the shell may be broken or deflated in the case where curing of the thermosetting resin has not yet proceeded when the temperature reaches T1.5. Moreover, along with this, the foamed thermally expandable microcapsule may have lowered $\Delta T$ (durability). Additionally, foam breaking may easily occur in the foam molded product.

Exemplary combinations of the thermosetting resin and the core agent wherein the thermosetting resin has a gel fraction of less than 5% at T1.0 and of 5% or more at T1.5 include a combination of Epikoto 828US (Japan Epoxy Resin Co., Ltd.) as the thermosetting resin and a mixture of isopentane (30% by weight) and isooctane (70% by weight) as the core agent, and a combination of jER 630 (Japan Epoxy Resin Co., Ltd.) as the thermosetting resin and a mixture of isopentane (70% by weight) and isooctane (30% by weight) as the core agent.

With regard to the amount of the thermosetting resin in the shell, the lower limit is preferably 0.01% by weight and the upper limit is preferably 30% by weight, for the entire polymers constituting the shell.

If the amount of the thermosetting resin is less than 0.01% by weight, thermosetting properties may not be expressed during heat-foaming. If the amount of the thermosetting resin is more than 30% by weight, the gas-barrier properties of the shell may be lowered to disturb foaming. The lower limit is more preferably 0.1% by weight and the upper limit is more preferably 15% by weight. Here, the phrase "the entire polymers constituting the shell" refers to the entire polymers constituting the shell other than the thermosetting resin.

The ratio of the monomer having a carboxyl group to the thermosetting resin is preferably not smaller than 1 (monomer having a carboxyl group/thermosetting resin ≥1). The ratio within that range reduces unreacted portions of the thermosetting resin and enables to exert the curability.

The thermally expandable microcapsule of the present invention includes a volatile expansion agent as a core agent.

The volatile expansion agent herein refers to a substance that is gasified at a temperature not higher than the softening point of the shell.

Examples of the volatile expansion agent include: low molecular weight hydrocarbons such as ethane, ethylene, propane, propene, n-butane, isobutane, butene, isobutene, n-pentane, isopentane, neopentane, n-hexane, heptane, and petroleum ether; chlorofluorocarbons such as $CCl_3F$, $CCl_2F_2$, $CClF_3$, and $CClF_2$—$CClF_2$; and tetraalkyl silanes such as tetramethyl silane, trimethylethyl silane, trimethylisopropyl silane, and trimethyl-n-propyl silane. Particularly preferable among these are isobutane, n-butane, n-pentane, isopentane, n-hexane, petroleum ether, and a mixture of these. Each of these volatile expansion agents may be used alone, or two or more of these may be used in combination.

In the thermally expandable microcapsule of the present invention, a low-boiling hydrocarbon having a carbon number of 10 or less is preferably used among the volatile expansion agents mentioned above. Use of such a hydrocarbon realizes a thermally expandable microcapsule that has a high expansion ratio and starts foaming quickly.

Moreover, a pyrolytic compound that is pyrolytically decomposed and gasified by heating may be used as a volatile expansion agent.

In the thermally expandable microcapsule of the present invention, the lower limit of the amount of the volatile expansion agent used as a core agent is preferably 10% by weight and the upper limit is preferably 25% by weight.

The thickness of the shell varies in accordance with the amount of the core agent. When the shell becomes too thick along with reduction in the amount of the core agent, the foaming properties are lowered. Increase in the amount of the core agent makes the strength of the shell lowered. In the case where the amount of the core agent is within 10 to 25% by weight, the thermally expandable microcapsule is prevented from being deflated and the foaming properties are improved at the same time.

The maximum foaming temperature (Tmax) of the thermally expandable microcapsule of the present invention is not particularly limited. The lower limit thereof is preferably 200° C. If the maximum foaming temperature is lower than 200° C., the thermally expandable microcapsule may have lowered thermal resistance. In such a case, at a high temperature, the thermally expandable microcapsule may easily burst and shrink and may fail to foam at a high expansion ratio. In addition, if the maximum foaming temperature is lower than 200° C., in the case where a masterbatch pellet is produced using the thermally expandable microcapsule, a shear force during the production of the pellet may problematically cause foaming, failing to stably produce an unfoamed masterbatch pellet. The lower limit of the maximum foaming temperature of the thermally expandable microcapsule is more preferably 210° C.

The maximum foaming temperature herein refers to a temperature at which the displacement of the diameter of the thermally expandable microcapsule reaches the maximum value in measurement of the thermally expandable microcapsule with heating from ambient temperatures.

With regard to the foaming starting temperature (Ts) of the thermally expandable microcapsule of the present invention, the upper limit is preferably 200° C. If the foaming starting temperature is higher than 200° C., especially in the case of injection molding, the expansion ratio may not increase. The lower limit of the foaming starting temperature is more preferably 130° C. and the upper limit is more preferably 180° C.

The volume average particle size of the thermally expandable microcapsule of the present invention is not particularly limited. The lower limit is preferably 10 μm and the upper limit is preferably 50 μm. If the volume average particle size is less than 10 μm, for example, in the case where the thermally expandable microcapsule is blended with a matrix resin and molded, bubbles in an obtainable foam molded product may be possibly too small, so that the weight reduction is insufficient. If the volume average particle size is more than 50 μm, for example, in the case where the thermally expandable microcapsule is blended with a matrix resin and molded, bubbles in an obtainable foam molded product may be too big, so that such a molding has a problem in terms of the strength. The lower limit of the volume average particle size is more preferably 15 μm and the upper limit is more preferably 40 μm.

A method for producing the thermally expandable microcapsule of the present invention is not particularly limited. An exemplary method includes the steps of preparing an aqueous dispersion medium; dispersing, in the aqueous dispersion medium, an oily mixture containing a monomer composition containing a nitrile-type monomer and a monomer having a carboxyl group, a thermosetting resin having no radical-polymerizable double bond and at least two functional groups reactive with a carboxyl group per molecule, and a volatile expansion agent; and polymerizing the monomer composition. Obtained in this manner is a thermal expansion microcapsule comprising a shell that contains a thermosetting resin and a polymer obtainable by polymerization of a monomer composition containing a nitrile-type monomer and a monomer having a carboxyl group, and a volatile expansion agent included in the shell as a core agent.

In the step of preparing an aqueous dispersion medium, for example, a polymerization reaction vessel is charged with water, a dispersion stabilizer, and an auxiliary stabilizer, if needed, so that an aqueous dispersion medium containing a dispersion stabilizer is prepared. The aqueous dispersion medium may further contain alkaline metal nitrite, stannous chloride, stannic chloride, potassium dichromate, and the like, if needed.

The dispersion stabilizer is not particularly limited, and examples thereof include silica, calcium phosphate, magnesium hydroxide, aluminum hydroxide, ferric hydroxide, barium sulfate, calcium sulfate, sodium sulfate, calcium oxalate, calcium carbonate, calcium carbonate, barium carbonate, and magnesium carbonate.

The auxiliary stabilizer is not particularly limited, and examples thereof include a condensation product of diethanol amine and aliphatic dicarboxylic acid, a condensation product of urea and formaldehyde, a water-soluble nitrogen-containing compound, polyethylene oxide, tetramethylammonium hydroxide, gelatin, methyl cellulose, polyvinyl alcohol, dioctyl sulfosuccinate, sorbitan ester, and various emulsifiers.

The water-soluble nitrogen-containing compound is not particularly limited, and examples thereof include polyvinyl pyrrolidone, polyethyleneimine, polyoxyethylene alkylamine, polydialkylaminoalkyl(meth)acrylate (e.g. polydimethylaminoethyl methacrylate, polydimethylaminoethyl acrylate), polydialkylaminoalkyl(meth)acrylamide (e.g. polydimethylaminopropyl acrylamide, polydimethylaminopropyl methacrylamide), polyacrylamide, polycationic acrylamide, polyaminesulfone, and polyallyl amine. In particular, polyvinyl pyrrolidone is preferable among these.

The combination of the dispersion stabilizer and the auxiliary stabilizer is not particularly limited, and examples thereof include a combination of colloidal silica and a condensation product, a combination of colloidal silica and a water-soluble nitrogen-containing compound, and a combination of an emulsifier and one of magnesium hydroxide and calcium phosphate. In particular, the combination of colloidal silica and a condensation product is preferable among these. The condensation product is preferably a condensation product of diethanol amine and aliphatic dicarboxylic acid. Particularly preferable are a condensation product of diethanol amine and adipic acid and a condensation product of diethanol amine and itaconic acid.

In the case where colloidal silica is used as the dispersion stabilizer, the amount of the colloidal silica is not particularly limited and may be appropriately determined in accordance with the particle size of a target thermally expandable microcapsule. The lower limit is preferably 1 part by weight and the upper limit is preferably 20 parts by weight, for 100 parts by weight of the entire monomer component. The lower limit is more preferably 2 parts by weight and the upper limit is more preferably 10 parts by weight.

In the case where the condensation product or the water-soluble nitrogen-containing compound is used as the auxiliary stabilizer, the amount of the condensation product or the water-soluble nitrogen-containing compound is not particularly limited and may be appropriately determined in accordance with the particle size of a target thermally expandable microcapsule. The lower limit is preferably 0.05 parts by weight and the upper limit is preferably 2 parts by weight, for 100 parts by weight of the entire monomer component.

The aqueous dispersion medium may further contain inorganic salts such as sodium chloride and sodium sulfate, in addition to the dispersion stabilizer and the auxiliary stabilizer. Addition of such an inorganic salt provides a thermally expandable microcapsule in which the particle shape is more uniform.

The amount of the inorganic salt is not particularly limited, and the upper limit is preferably 100 parts by weight for 100 parts by weight of the entire monomer component.

The aqueous dispersion medium is prepared by addition of the dispersion stabilizer and the auxiliary stabilizer to deionized water. The pH of the deionized water may be appropriately determined in accordance with the kind of the dispersion stabilizer and the auxiliary stabilizer to be used. In the case where silica such as colloidal silica is used as the dispersion stabilizer, for example, an acid such as hydrochloric acid is added, if needed, to adjust the pH of the system to 3 to 4 and polymerization is conducted in the step described later under acidic conditions. In the case where magnesium hydroxide or calcium phosphate is used as the dispersion stabilizer, the system is alkalified so that polymerization is conducted in the step described later under alkaline conditions.

In production of the thermally expandable microcapsule of the present invention, subsequently, an oily mixture containing the monomer composition, the thermosetting resin, and the volatile expansion agent is dispersed in the aqueous dispersion medium.

In this step, the monomer composition, the thermosetting resin, and the volatile expansion agent may be individually added to the aqueous dispersion medium so as to prepare the oily mixture in the aqueous dispersion medium. Commonly, they are preliminarily mixed to form an oily mixture before being added to the aqueous dispersion medium. In this case, the oily mixture and the aqueous dispersion medium may be separately prepared in different vessels, and then mixed with stirring in another vessel so that the oily mixture is dispersed in the aqueous dispersion medium. After that, the dispersion may be put into a polymerization reaction vessel.

A polymerization initiator is used to polymerize monomers in the monomer composition. The polymerization initiator may be preliminarily added to the oily mixture or added after mixing of the aqueous dispersion medium and the oily mixture with stirring in a polymerization reaction vessel.

In the step where an oily mixture containing the monomer composition and the volatile expansion agent is dispersed in the aqueous dispersion medium, the oily mixture is dispersed while being emulsified to have a predetermined particle size in the aqueous dispersion medium.

A method of emulsification/dispersion is not particularly limited, and examples thereof include a method of stirring the materials with a homomixer (a homomixer supplied by, for example, Tokushu Kika Kogyo Co., Ltd.) or the like, and a method of introducing the materials into a static dispersion machine such as a line mixer and an element-type static dispersion machine. The static dispersion machine may be individually charged with the aqueous dispersion medium and the oily mixture or charged with the dispersion prepared by preliminary mixing and stirring the aqueous dispersion medium and the oily mixture.

In production of the thermally expandable microcapsule of the present invention, subsequently, the monomer composition is copolymerized. The copolymerization method is not particularly limited, and examples thereof include polymerization of the monomer composition by heating.

Accordingly, a thermally expandable microcapsule is produced which comprises: a shell containing a thermosetting resin and a polymer obtainable by polymerization of a monomer composition containing a nitrile-type monomer and a monomer having a carboxyl group; and a volatile expansion agent included in the shell as a core agent. The obtained thermally expandable microcapsule may be subsequently subjected to dehydration and drying.

Applications of the thermally expandable microcapsule of the present invention are not particularly limited. For example, the thermally expandable microcapsule of the present invention is blended with a matrix resin and then molded by a molding method such as injection molding and extrusion molding. Then, a foam molded product is produced in which heat shielding properties, heat insulation properties, sound insulation properties, sound absorption properties, damping properties, and weight reduction are all achieved. The thermally expandable microcapsule of the present invention hardly bursts and shrinks even at a high temperature and foams at a high expansion ratio, and therefore, the thermally expandable microcapsule is favorably used for foam molding comprising the step of heating at a high temperature.

A masterbatch pellet obtainable by adding a matrix resin such as a thermoplastic resin to the thermally expandable microcapsule of the present invention can be formed into a foam molded product by a method in which the masterbatch pellet is molded by a molding method such as injection molding and the thermally expandable microcapsule in the pellet is allowed to foam by heat generated in the molding. Such a masterbatch is also one aspect of the present invention.

The thermoplastic resin is not particularly limited, provided that it does not disturb the aim of the present invention. Examples thereof include: common thermoplastic resins such as polyvinyl chloride, polystyrene, polypropylene, polypropylene oxide, and polyethylene; and engineering plastics such as polybutylene terephthalate, nylon, polycarbonate, and polyethylene terephthalate. Moreover, also usable are thermoplastic elastomers of ethylene type, vinyl chloride type, olefin type, urethane type, and ester type. These resins may be used in combination.

The proper amount of the thermally expandable microcapsule is 0.5 to 20 parts by weight and preferably 1 to 10 parts by weight for 100 parts by weight of the thermoplastic resin. The thermally expandable microcapsule may be used in combination with a chemical foaming agent such as sodium hydrogen carbonate (baking soda) and ADCA (azo type).

A method for producing the masterbatch pellet is not particularly limited. For example, raw materials including a matrix resin such as a thermoplastic resin and various additives are preliminarily kneaded using a same-direction twin-screw extruder. The kneaded mass is heated to a predetermined temperature. Then, a foaming agent such as the thermally expandable microcapsule of the present invention is added thereto. The resulting mixture is further kneaded and cut into a desired size using a pelletizer so as to be formed into a pellet shape. In this manner a masterbatch pellet may be produced.

Alternatively, raw materials including a matrix resin such as a thermoplastic resin and the thermally expandable microcapsule may be kneaded using a batch-type kneader and then granulated using a granulator, so that a pellet-shaped masterbatch pellet is produced.

The kneader is not particularly limited as long as kneading is conducted without any damage to the thermally expandable microcapsule. Examples thereof include a pressure kneader and a Banbury mixer.

Advantageous Effects of Invention

The present invention provides a thermally expandable microcapsule that maintains a high expansion ratio and hardly bursts and shrinks even at a high temperature, a foamable thermoplastic resin masterbatch and a foam molded product that are produced using the thermally expandable microcapsule, and a method for producing the thermally expandable microcapsule.

DESCRIPTION OF EMBODIMENTS

The present invention is described in more detail with reference to examples in the following. The present invention is not limited only to these examples.

Examples 1 to 25, Comparative Examples 1 to 8

A polymerization reaction vessel was charged with water (250 parts by weight), colloidal silica as a dispersion stabilizer (25 parts by weight, 20% by weight, Asahi Denka), polyvinyl pyrrolidone (0.8 parts by weight, BASF), and 1-N hydrochloric acid (1.8 parts by weight) so that an aqueous dispersion medium was prepared.

To the aqueous dispersion medium, an oily mixture comprising a monomer, a thermosetting resin, a crosslinking agent, a polymerization initiator, and a volatile expansion agent at a blending ratio shown in Table 1 are added and suspended. In this manner, a dispersion liquid was prepared. The resulting dispersion liquid was stirred using a homogenizer and placed in a nitrogen-substituted pressure polymerization vessel. The dispersion liquid was allowed to react for 6 hours at 60° C. and 5 hours at 80° C. while being pressurized (0.5 MPa), so that a reaction product was obtained. The reaction product was filtered and washed with water repeatedly. The resulting matter was dried to give a thermally expandable microcapsule.

Used thermosetting resins are listed below:

Bisphenol A-type epoxy resin (Epikote 828US, Japan Epoxy Resin Co., Ltd., number of radical-polymerizable double bonds: 0, number of functional groups reactive with carboxyl group: 2);

Aminophenol-type epoxy resin (jER 630, Japan Epoxy Resin Co., Ltd., number of radical-polymerizable double bonds: 0, number of functional groups reactive with carboxyl group: 3);

Hydrogenated bisphenol A-type epoxy resin (YX 8000, Japan Epoxy Resin Co., Ltd., number of radical-polymerizable double bonds: 0, number of functional groups reactive with carboxyl group: 2);

Hydrogenated glycidylamine-type epoxy resin (TETRAD-C, MITSUBISHI GAS CHEMICAL COMPANY. INC., number of radical-polymerizable double bonds: 0, number of functional groups reactive with carboxyl group: 2);

Glycidylamine-type epoxy resin (TETRAD-X, MITSUBISHI GAS CHEMICAL COMPANY. INC., number of radical-polymerizable double bonds: 0, number of functional groups reactive with carboxyl group: 4);

Novolac-type phenol resin (PR-50731, SUMITOMO BAKELITE CO., LTD., number of radical-polymerizable double bonds: 0, number of functional groups reactive with carboxyl group: n (n≥2)); and Sorbitol polyglycidyl ether (DENACOL EX-622, Nagase ChemteX Corporation, number of radical-polymerizable double bonds: 0, number of functional groups reactive with carboxyl group: 4).

Used crosslinking agents are listed below:

Trimethylolpropane triacrylate (number of radical-polymerizable double bonds: 3, number of functional groups reactive with carboxyl group: 0);

Glycidyl methacrylate (number of radical-polymerizable double bonds: 1, number of functional groups reactive with carboxyl group: 1); and N-methylolacrylamide (number of radical-polymerizable double bonds: 1, number of functional groups reactive with carboxyl group: 1).

(Evaluation)

The following evaluations were conducted on the thermosetting resins and crosslinking agents used in the examples and comparative examples, and on the thermally expandable microcapsules obtained in the examples and comparative examples. Tables 1 to 3 show the results.

(1) Gel Fraction

The temperature (T1.0) when the vapor pressure of the core agent in each of the examples and comparative examples reaches 1.0 MPa and the temperature (T1.5) when the vapor pressure reaches 1.5 MPa were calculated using the following Antoine equation. With regard to the mixture of isopentane and isooctane, T1.0 and T1.5 were calculated based on the blending ratio.

$$\log_{10} P = A - (B/(T+C))$$

In the formula, P represents a vapor pressure, T represents a temperature, and A, B, and C indicate Antoine constants. Here, the Antoine constants of isopentane and isooctane are mentioned below.

Isopentane: A=6.78967, B=1020.12, C=233.97

Isooctane: A=7.372, B=1578.81, C=230.7

Next, the thermosetting resin or the crosslinking agent (0.5 g) used in each of the examples and comparative examples was mixed with citric acid (0.15 g) on an aluminum cup. The mixture was heated on a hot plate (CHPS-170DR, AS ONE Corporation) for 1 minute. The heated sample was placed into N,N-dimethyl formamide (100 g) and swelled at 75° C. for 12 hours or longer. The swelled product was filtered using a stainless-steel mesh (aperture: 200 mesh/inch) and dried at 170° C. for 2 hours on the stainless-steel mesh. The weight of the resulting sample (dry weight of the swelled body) was measured and the gel fraction was obtained based on the following formula. The gel fractions at T1.0 and T1.5 were obtained and evaluated in accordance with the following criteria.

◎: "Gel fraction at T1.0 was less than 5%" and "Gel fraction at T1.5 was 5% or more" were both satisfied ○: Both or one of "Gel fraction at T1.0 was less than 5%" and "Gel fraction at T1.5 was 5% or more" was not satisfied.

Gel fraction (%)=(dry weight of swelled body/0.615*)×100

*0.615 (g)=0.5 (g) [weight of thermosetting resin]+ 0.15 (g) [weight of citric acid]

(2) Expansion Ratio

The expansion ratio at the maximum foaming was measured using a heat-foaming microscopic apparatus (JAPAN HIGH TECH CO., LTD.). The evaluation criteria were as follows.

X: The expansion ratio at the maximum foaming was less than 3 times

○: The expansion ratio at the maximum foaming was 3 times or more and less than 5 times ◎: The expansion ratio at the maximum foaming was 5 times or more (3) Thermal Resistance The expansion ratio at 250° C. was measured using a heat-foaming microscopic apparatus (JAPAN HIGH TECH CO., LTD.). The evaluation criteria were as follows.

X: The expansion ratio at 250° C. was less than 2 times

○: The expansion ratio at 250° C. was 2 times or more and less than 3 times

◎: The expansion ratio at 250° C. was 3 times or more (4) Durability

The temperature range (ΔT) where the expansion ratio is two times or more is measured using a heat-foaming microscopic apparatus (JAPAN HIGH TECH CO., LTD.). The evaluation criteria were as follows.

X: The ΔT was less than 50° C.

○: The ΔT was 50° C. or more and less than 65° C.

◎: The ΔT was 65° C. or more.

TABLE 1

| | | | Example 1 | Example 2 | Example 3 | Example 4 | Example 5 | Example 6 | Example 7 |
|---|---|---|---|---|---|---|---|---|---|
| Nitrile-type monomer | | Acrylonitrile | 29.6 | 30.1 | 30.3 | 29.6 | 39.8 | 34.7 | 25.5 |
| | | Methacrylonitrile | 50.0 | 49.9 | 49.5 | 50 | 39.8 | 34.7 | 43.9 |
| Monomer having a carboxyl group | | Methacrylic acid | 20.4 | 20 | 20.2 | 20.4 | 20.4 | 30.6 | 30.6 |
| Volatile expansion agent | Kind | Isopentane | 10 | 10 | 10 | 10 | 10 | 10 | 10 |
| | | Isooctane | 20 | 20 | 20 | 20 | 20 | 20 | 20 |
| | Characteristics | T1.0 (° C.) | 154.6 | 154.6 | 154.6 | 154.6 | 154.6 | 154.6 | 154.6 |
| | | T1.5 (° C.) | 180.1 | 180.1 | 180.1 | 180.1 | 180.1 | 180.1 | 180.1 |
| Thermosetting resin | Kind | 828US | 2 | 0.2 | 1 | 5 | 2 | 2 | 2 |
| | Characteristics | Number of radical-polymerizable double bonds | 0 | 0 | 0 | 0 | 0 | 0 | 0 |
| | | Number of functional groups reactive with carboxyl group | 2 | 2 | 2 | 2 | 2 | 2 | 2 |
| | | Gel fraction (%) at T1.0 | 0.3 | 0.3 | 0.3 | 0.3 | 0.3 | 0.3 | 0.3 |
| | | Gel fraction (%) at T1.5 | 5 | 5 | 5 | 5 | 5 | 5 | 5 |
| | | Gel fraction evaluation | ◎ | ◎ | ◎ | ◎ | ◎ | ◎ | ◎ |
| Evaluation | Expansion ratio | Evaluation | ◎ | ◎ | ○ | ○ | ○ | ○ | ○ |
| | | Measured value (times) | 5 | 5 | 4 | 4 | 3.5 | 3 | 3.5 |
| | Thermal resistance | Evaluation | ◎ | ○ | ◎ | ◎ | ◎ | ◎ | ◎ |
| | | Measured value (times) | 4 | 2.5 | 3 | 3.5 | 3 | 3.5 | 4 |
| | Durability | Evaluation | ◎ | ○ | ◎ | ◎ | ◎ | ◎ | ◎ |
| | | Measured value (° C.) | 75 | 60 | 75 | 80 | 70 | 70 | 80 |

TABLE 1-continued

| | | | Example 8 | Example 9 | Example 10 | Example 11 | Example 12 | Example 13 |
|---|---|---|---|---|---|---|---|---|
| Nitrile-type monomer | | Acrylonitrile | 35 | 35 | 29.6 | 29.6 | 29.6 | 29.6 |
| | | Methacrylonitrile | 50 | 55 | 50 | 50 | 50 | 50 |
| Monomer having a carboxyl group | | Methacrylic acid | 15 | 10 | 20.4 | 20.4 | 20.4 | 20.4 |
| Volatile expansion agent | Kind | Isopentane | 10 | 10 | 30 | 20 | 15 | 0 |
| | | Isooctane | 20 | 20 | 0 | 10 | 15 | 30 |
| | Characteristics | T1.0 (° C.) | 154.6 | 154.6 | 116 | 129.2 | 139.5 | 220.8 |
| | | T1.5 (° C.) | 180.1 | 180.1 | 138.5 | 152.9 | 164.1 | 224.7 |
| Thermosetting resin | Kind | 828US | 2 | 2 | 2 | 2 | 2 | 2 |
| | Characteristics | Number of radical-polymerizable double bonds | 0 | 0 | 0 | 0 | 0 | 0 |
| | | Number of functional groups reactive with carboxyl group | 2 | 2 | 2 | 2 | 2 | 2 |
| | | Gel fraction (%) at T1.0 | 0.3 | 0.3 | 0 | 0 | 0.1 | 8.6 |
| | | Gel fraction (%) at T1.5 | 5 | 5 | 0 | 0.3 | 1 | 8.6 |
| | | Gel fraction evaluation | ◎ | ◎ | ○ | ○ | ○ | ○ |
| Evaluation | Expansion ratio | Evaluation | ○ | ○ | ○ | ○ | ◎ | ○ |
| | | Measured value (times) | 3.5 | 3.5 | 4 | 4.5 | 5 | 4.5 |
| | Thermal resistance | Evaluation | ◎ | ○ | ◎ | ◎ | ◎ | ◎ |
| | | Measured value (times) | 3 | 2.5 | 3.5 | 4 | 4 | 4 |
| | Durability | Evaluation | ◎ | ○ | ○ | ○ | ○ | ◎ |
| | | Measured value (° C.) | 65 | 60 | 55 | 60 | 60 | 75 |

TABLE 2

| | | | Example 14 | Example 15 | Example 16 | Example 17 | Example 18 | Example 19 | Example 20 |
|---|---|---|---|---|---|---|---|---|---|
| Nitrile-type monomer | | Acrylonitrile | 29.6 | 29.6 | 29.6 | 29.6 | 29.6 | 29.6 | 29.6 |
| | | Methacrylonitrile | 50 | 50 | 50 | 50 | 50 | 50 | 50 |
| Monomer having a carboxyl group | | Methacrylic acid | 20.4 | 20.4 | 20.4 | 20.4 | 20.4 | 20.4 | 20.4 |
| Volatile expansion agent | Kind | Isopentane | 10 | 30 | 20 | 15 | 0 | 10 | 10 |
| | | Isooctane | 20 | 0 | 10 | 15 | 30 | 20 | 20 |
| | Characteristics | T1.0 (° C.) | 154.6 | 116 | 129.2 | 139.5 | 220.8 | 154.6 | 154.6 |
| | | T1.5 (° C.) | 180.1 | 138.5 | 152.9 | 164.1 | 224.7 | 180.1 | 180.1 |
| Thermosetting resin | Kind | 828US | — | — | — | — | — | — | — |
| | | JER-630 | 2 | 2 | 2 | 2 | 2 | — | — |
| | | YX8000 | — | — | — | — | — | 2 | — |
| | | TETRAD-C | — | — | — | — | — | — | 2 |
| | | TETRAD-X | — | — | — | — | — | — | — |
| | | PR-50731 | — | — | — | — | — | — | — |
| | | EX-622 | — | — | — | — | — | — | — |
| | Characteristics | Number of radical-polymerizable double bonds | 0 | 0 | 0 | 0 | 0 | 0 | 0 |
| | | Number of functional groups reactive with carboxyl group | 3 | 3 | 3 | 3 | 3 | 2 | 4 |
| | | Gel fraction (%) at T1.0 | 5.3 | 0.1 | 0.2 | 1.1 | 16.2 | 0.1 | 11 |
| | | Gel fraction (%) at T1.5 | 10.5 | 0.5 | 5.3 | 8.2 | 16.3 | 4.5 | 18 |
| | | Gel fraction evaluation | ◎ | ○ | ◎ | ◎ | ○ | ○ | ○ |
| Evaluation | Expansion ratio | Evaluation | ○ | ○ | ◎ | ◎ | ○ | ○ | ○ |
| | | Measured value (times) | 3 | 4 | 5.5 | 5 | 4.5 | 4 | 3.5 |
| | Thermal resistance | Evaluation | ○ | ◎ | ◎ | ◎ | ◎ | ◎ | ◎ |
| | | Measured value (times) | 2.5 | 3 | 3.5 | 3.5 | 3 | 3 | 3 |
| | Durability | Evaluation | ◎ | ○ | ◎ | ◎ | ◎ | ○ | ○ |
| | | Measured value (° C.) | 65 | 60 | 65 | 65 | 65 | 50 | 50 |

| | | | Example 21 | Example 22 | Example 23 | Example 24 | Example 25 |
|---|---|---|---|---|---|---|---|
| Nitrile-type monomer | | Acrylonitrile | 29.6 | 29.6 | 29.6 | 29.9 | 29.9 |
| | | Methacrylonitrile | 50 | 50 | 50 | 49.5 | 49.5 |
| Monomer having a carboxyl group | | Methacrylic acid | 20.4 | 20.4 | 20.4 | 20.6 | 20.6 |
| Volatile expansion agent | Kind | Isopentane | 20 | 10 | 10 | 20 | 20 |
| | | Isooctane | 10 | 20 | 20 | 10 | 10 |
| | Characteristics | T1.0 (° C.) | 129.2 | 154.6 | 154.6 | 129.2 | 129.2 |
| | | T1.5 (° C.) | 152.9 | 180.1 | 180.1 | 152.9 | 152.9 |
| Thermosetting resin | Kind | 828US | — | — | — | 1 | 1 |
| | | JER-630 | — | — | — | — | 0.2 |
| | | YX8000 | — | — | — | — | — |
| | | TETRAD-C | — | — | — | — | — |
| | | TETRAD-X | 0.2 | — | — | — | 0.1 |
| | | PR-50731 | — | 2 | — | — | — |
| | | EX-622 | — | — | 2 | — | — |
| | Characteristics | Number of radcal-polymerizable double bonds | 0 | 0 | 0 | 0 | 0 |

TABLE 2-continued

| | | | | | | | | |
|---|---|---|---|---|---|---|---|---|
| | | Number of functional groups reactive with carboxyl group | 4 | ≥2 | 4 | 2 | 3 | 2 | 4 |
| | | Gel fraction (%) at T1.0 | 5 | 41 | 1.5 | 0 | 0.2 | 0 | 5 |
| | | Gel fraction (%) at T1.5 | 15 | 65 | 8.9 | 0.3 | 5.3 | 0.3 | 15 |
| | | Gel fraction evaluation | ○ | ○ | ⊚ | ⊚ | ⊚ | ⊚ | ○ |
| Evaluation | Expansion ratio | Evaluation | ○ | ○ | ○ | ⊚ | | ○ | |
| | | Measured value (times) | 4 | 3 | 4 | 5.5 | | 4.5 | |
| | Thermal resistance | Evaluation | ⊚ | ○ | ○ | ⊚ | | ⊚ | |
| | | Measured value (times) | 3.5 | 2.5 | 2 | 4.5 | | 4 | |
| | Durability | Evaluation | ○ | ⊚ | ○ | ⊚ | | ⊚ | |
| | | Measured value (°C) | 60 | 75 | 55 | 90 | | 90 | |

TABLE 3

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Nitrile-type monomer | | Acrylonitrile | 29.6 | 60 | 0 | 29 | 29 | 51 | 29 | 30 |
| | | Methacrylonitrile | 50 | 40 | 0 | 49 | 49 | 18 | 49 | 50 |
| Monomer having a carboxyl group | | Methacrylic acid | 20.4 | 0 | 100 | 20 | 20 | 26 | 20 | 20 |
| Volatile expansion agent | Kind | Isopentane | 10 | 10 | 10 | 10 | 10 | 0 | 10 | 20 |
| | | Isooctane | 20 | 20 | 20 | 20 | 20 | 30 | 20 | 10 |
| | Characteristics | T1.0 (°C) | 154.6 | 154.6 | 154.6 | 154.6 | 154.6 | 220.8 | 154.6 | 158.5 |
| | | T1.5 (°C) | 180.1 | 180.1 | 180.1 | 180.1 | 180.1 | 244.7 | 180.1 | 184.2 |
| Thermosetting resin | Kind | 828US | — | 2 | 2 | — | — | — | — | — |
| Crosslinking agent | Kind | Trimethylolpropane triacrylate | — | — | — | 2 | — | — | — | — |
| | | Glycidyl methacrylate | — | — | — | — | 2 | 5 | — | — |
| | | N-methylol-acrylamide | — | — | — | — | — | — | 2 | — |
| Thermosetting resin and crosslinking agent | Characteristics | Number of radical-polymerizable double bonds | — | 0 | 0 | 3 | 1 | 1 | 1 | — |
| | | Number of functional groups reactive with carboxyl group | — | 2 | 2 | 0 | 1 | 1 | 0 | — |
| | | Gel fraction (%) at T1.0 | — | 0.3 | 0.3 | — | — | — | — | — |
| | | Gel fraction (%) at T1.5 | — | 5 | 5 | — | — | — | — | — |
| | | Gel fraction evaluation | — | ⊚ | ⊚ | — | — | — | — | — |
| Evaluation | Expansion ratio | Evaluation | ○ | ⊚ | X | ○ | X | ○ | X | ○ |
| | | Measured value (times) | 4.5 | 5 | Not granulated | 4 | 2.5 | 3.5 | 2 | 4.5 |
| | Thermal resistance | Evaluation | X | X | X | ○ | ○ | ⊚ | ○ | X |
| | | Measured value (times) | 1 | 1.5 | Not granulated | 2 | 2.5 | 3.5 | 2 | 1 |
| | Durability | Evaluation | X | X | X | X | X | X | X | X |
| | | Measured value (°C) | 30 | 30 | Not granulated | 40 | 45 | 45 | 30 | 30 |

Example 26

Production of Foamable Thermoplastic Resin Masterbatch

Powdery or pelleted low-density polyethylene (100 parts by weight) and stearic acid (10 parts by weight) as a lubricant were mixed using a Banbury mixer. When the temperature reaches about 100° C., the thermally expandable microcapsule obtained in Example 1 (100 parts by weight) was added. After further kneading for 30 seconds, the kneaded mass was extruded concurrently with pelletization thereof. In this manner, a masterbatch pellet was obtained.

(Production of Foam Molded Product)

The obtained masterbatch pellet (4 parts by weight), TPE (100 parts by weight, MITSUBISHI CHEMICAL Corporation, Rabalon MJ-4300C), and a pigment (3 parts by weight, carbon black/PE) were mixed. The mixed pellet was charged into a hopper of a screw type injection molding machine equipped with an accumulator. The mixed pellet was melted, kneaded, and injection-molded. In this manner, a plate-shaped foam molded product was obtained. The molding conditions were the cylinder temperature of 230° C. and the die temperature of 50° C.

Example 27

A foam molded product was produced in the same manner as in Example 26, except that the following method was employed in (Production of foam molded product).
(Production of Foam Molded Product)
The obtained masterbatch pellet (2.5 parts by weight), a thermoplastic elastomer (100 parts by weight, Hytrel 3078, DuPont), and a pigment (3 parts by weight, color MB, TOKYO PRINTING INK MFG. CO., LTD.) were mixed. The mixed pellet was charged into a hopper of an extrusion molding machine. The mixed pelled was melted, kneaded, and extrusion-molded. In this manner, a plate-shaped foam molded product was obtained. The molding condition was the die temperature of 190° C.

Comparative Example 9

A masterbatch pellet and a foam molded product were obtained in the same manner as in Example 26, except that the thermally expandable microcapsule obtained in Comparative Example 1 was used.

Comparative Example 10

A foam molded product was obtained in the same manner as in Comparative Example 7, except that the same method as in Example 27 was employed in (Production of a foam molded product).

Comparative Example 11

A masterbatch pellet and a foam molded product were obtained in the same manner as in Example 26, except that the thermally expandable microcapsule obtained in Comparative Example 2 was used.

Comparative Example 12

A foam molded product was obtained in the same manner as in Comparative Example 9, except that the method similar to that in Example 27 was employed in (Production of a foam molded product).
(Evaluation)
(5) Expansion Ratio
The relative density (D1) of each obtained foam molded product and the relative density (D0) of the base were measured. The ratio between them (D0/D1) was calculated as the expansion ratio. The relative density was measured using an electronic densimeter (MIRAGE TRADING CO., LTD., ED-120T). The evaluation criteria were as follows.
  X: The expansion ratio was less than 2 times
  ◯: The expansion ratio was 2 times or more
(6) Durometer Hardness (Tactile Impression)
The durometer hardness of each obtained foam molded product was measured using a type A durometer (KOBUNSHI KEIKI CO., LTD., ASKER rubber hardneess tester Model. A) in accordance with JIS K 6253. The evaluation criteria were as follows.
  X: The durometer hardness exceeded 50
  ◯: The durometer hardness was 50 or less
(7) Static Rigidity
An indenter (stainless-steel, Φ 15 mm×10 mm cylinder shape) was placed on the surface of each obtained foam molded product, and the height thereof was marked as 0. The indenter was pressurized at 91.5 N for 60 seconds and the displacement (S1) was measured. Then, the indenter was pressurized at 320 N for 60 seconds and the displacement (S2) was measured. Based on the following equation, the static rigidity was calculated.

$$\text{Static rigidity} = (320-91.5)/(S2-S1) \ [N/mm]$$

A static testing machine (Shimazu Corporation, EZGraph) was used for the measurement. The evaluation criteria were as follows.
  X: The static rigidity exceeded 200
  ◯: The static rigidity was 200 or less
(8) Dynamic Rigidity and Dynamic/Static Ratio
An indenter (stainless-steel, φ 15 mm×10 mm cylinder shape) was placed on the surface of the obtained foam molded product, and the height thereof was marked as 0. The indenter was subjected to cyclic pressurization at a pressure of 320 N at the maximum and 91.5 N at the minimum. The average values of the following items between the 900th cycle and the 1000th cycle were obtained.
Force (FU) and displacement (SU) at the maximum pressure
Force (FD) and displacement (SD) at the minimum
Based on the obtained values, the dynamic rigidity was calculated using the following equation.

$$\text{Dynamic rigidity} = (FU-FD)/(SU-SD) \ [N/mm]$$

A tensilon universal testing machine (A&D Company, Limited, UTA-500) was used for the measurement.
Based on the obtained "dynamic rigidity" and "static rigidity", the dynamic/static ratio was obtained using the following equation.

$$\text{Dynamic/static ratio} = \text{dynamic rigidity/static rigidity [times]}$$

The evaluation standards were "X" in the case where the ratio exceeds 1.5 times and "◯" in the case where the ratio is 1.5 times or less.

TABLE 4

|  |  |  | Example 26 | Example 27 | Comparative Example 9 | Comparative Example 10 | Comparative Example 11 | Comparative Example 12 |
|---|---|---|---|---|---|---|---|---|
| Composition and the like | Master-batch | Thermally expandable microcapsule | 100 | 100 | 100 | 100 | 100 | 100 |
|  |  | Matrix resin (LDPE) | 100 | 100 | 100 | 100 | 100 | 100 |
|  |  | Lubricant (stearic acid) | 10 | 10 | 10 | 10 | 10 | 10 |
|  | Foamed product | Base resin (styrene-type thermoplastic elastomer) (Rabalon MJ-4300C) | 100 | — | 100 | — | 100 | — |
|  |  | Base resin (polyester block copolymer) (Hytrel 3078) | — | 100 | — | 100 | — | 100 |
|  |  | Masterbatch | 4 | 2.5 | 4 | 2.5 | 4 | 2.5 |

TABLE 4-continued

| | | | Example 26 | Example 27 | Comparative Example 9 | Comparative Example 10 | Comparative Example 11 | Comparative Example 12 |
|---|---|---|---|---|---|---|---|---|
| | | Pigment | 3 | 3 | 3 | 3 | 3 | 3 |
| | | Molding method | Injection molding | Extrusion molding | Injection molding | Extrusion molding | Injection molding | Extrusion molding |
| Evaluation | Foamed product | Expansion ratio | ○ | ○ | X | X | X | X |
| | | Tactile impression (Durometer hardness) | ○ | ○ | ○ | ○ | X | X |
| | | Static rigidity | ○ | — | ○ | — | X | — |
| | | Dynamic/static ratio | ○ | — | X | — | X | — |

INDUSTRIAL APPLICABILITY

The present invention provides a thermally expandable microcapsule that maintains a high expansion ratio and hardly bursts and shrinks even at a high temperature, a foamable thermoplastic resin masterbatch and a foam molded product that are produced using the thermally expandable microcapsule, and a method for producing the thermally expandable microcapsule.

The invention claimed is:

1. A thermally expandable microcapsule comprising a volatile expansion agent included in a shell as a core agent and the shell formed of a polymer, wherein
the shell contains a thermosetting resin and a polymer obtained by polymerization of a monomer composition containing a nitrile-type monomer and a monomer having a carboxyl group,
the thermosetting resin has no radical-polymerizable double bond and at least two functional groups reactive with a carboxyl group per molecule,
an amount of the thermosetting resin is 0.01 to 30% by weight relative to entire polymers constituting the shell,
an amount of the monomer having a carboxyl group is 1 to 50 parts by weight relative to 100 parts by weight of the monomer composition, and
the thermosetting resin has a gel fraction of less than 5% at T1.0 and a gel fraction of not less than 5% at T1.5, wherein T1.0 indicates a temperature when the core agent shows a vapor pressure of 1.0 MPa and T1.5 indicates a temperature when the core agent shows a vapor pressure of 1.5 MPa.

2. The thermally expandable microcapsule according to claim 1,
wherein the functional groups reactive with a carboxyl group are epoxy groups.

3. A foamable thermoplastic resin masterbatch,
which comprises the thermally expandable microcapsule according to claim 1, and a thermoplastic resin.

4. A foam molded product,
which is produced with the thermally expandable microcapsule according to claim 1.

5. A method for producing the thermally expandable microcapsule according to claim 1,
which comprises the steps of:
preparing an aqueous dispersion medium;
dispersing in the aqueous dispersion medium an oily mixture containing a monomer composition containing a nitrile-type monomer and a monomer having a carboxyl group, a thermosetting resin having no radically polymerizable double bond and at least two functional groups reactive with a carboxyl group per molecule, and a volatile expansion agent; and
polymerizing the monomer composition,
wherein the thermosetting resin has a gel fraction of less than 5% at T1.0 and a gel fraction of not less than 5% at T1.5, wherein T1.0 indicates a temperature when the core agent shows a vapor pressure of 1.0 MPa and T1.5 indicates a temperature when the core agent shows a vapor pressure of 1.5 MPa.

6. A foam molded product,
which is produced with the foamable thermoplastic resin masterbatch according to claim 3.

* * * * *